(12) United States Patent
Ahn et al.

(10) Patent No.: US 10,287,377 B2
(45) Date of Patent: May 14, 2019

(54) METHOD OF PREPARING VINYL CHLORIDE-BASED COPOLYMER AND VINYL CHLORIDE-BASED COPOLYMER PREPARED THEREBY

(71) Applicant: LG CHEM, LTD., Seoul (KR)

(72) Inventors: Seong Yong Ahn, Daejeon (KR); Kun Ji Kim, Daejeon (KR); Se Woong Lee, Daejeon (KR); Bhom Ri Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/508,326

(22) PCT Filed: Jun. 3, 2016

(86) PCT No.: PCT/KR2016/005944
§ 371 (c)(1),
(2) Date: Mar. 2, 2017

(87) PCT Pub. No.: WO2016/195434
PCT Pub. Date: Dec. 8, 2016

(65) Prior Publication Data
US 2017/0283533 A1    Oct. 5, 2017

(30) Foreign Application Priority Data
Jun. 5, 2015   (KR) ........................ 10-2015-0080159

(51) Int. Cl.
*C08F 214/06*   (2006.01)
*C08F 222/14*   (2006.01)

(52) U.S. Cl.
CPC .......... *C08F 214/06* (2013.01); *C08F 222/14* (2013.01)

(58) Field of Classification Search
CPC ............................. C08F 214/06; C08F 222/14
See application file for complete search history.

(56) References Cited

U.S. PATENT DOCUMENTS

| 2,731,449 A | 1/1956 | Rowland et al. |
| 3,558,566 A | 1/1971 | Balwe et al. |
| 3,950,312 A | 4/1976 | Kurz et al. |
| 4,210,739 A * | 7/1980 | Gallagher ............. C08F 214/06 526/325 |
| 7,001,960 B2 * | 2/2006 | Ooura ................... C08F 114/06 526/200 |
| 2017/0291975 A1 * | 10/2017 | Ahn ........................ C08F 14/06 |

FOREIGN PATENT DOCUMENTS

| CN | 102311515 A | 1/2012 |
| GB | 1038261 A | 8/1966 |
| GB | 1517428 A | 7/1978 |
| JP | 02-269710 A | 11/1990 |
| JP | 02-269711 A | 11/1990 |
| JP | 2001-200095 A | 7/2001 |
| KR | 1994-0014573 A | 7/1994 |
| KR | 10-0160332 B1 | 1/1999 |
| KR | 10-2012-0024109 A | 3/2012 |
| KR | 2012-0054162 A | 5/2012 |
| KR | 10-2012-0130412 A | 12/2012 |

OTHER PUBLICATIONS

"Experiment Summary of Vinyl Chloride and Dioctyl Maleate Copolymer Resin," Wuxi Electrochemical Plant, p. 20-30, Mar. 25, 1974.

* cited by examiner

Primary Examiner — Peter D. Mulcahy

(74) Attorney, Agent, or Firm — Dentons US LLP

(57) ABSTRACT

The present invention relates to a method of preparing a vinyl chloride-based copolymer having excellent plasticity and processability, a vinyl chloride-based copolymer prepared thereby, a thermoplastic resin composition including the vinyl chloride-based copolymer, and a thermoplastic resin molded article prepared from the composition. Since the preparation method may improve copolymerizability with a vinyl chloride-based monomer by continuously adding or dividedly adding an unsaturated fatty acid ester mixture used as a comonomer during the time of specific polymerization conversion rate, the unreacted unsaturated fatty acid ester mixture may be reduced, and, as a result, the conversion rate of the vinyl chloride-based copolymer may be significantly improved. Thus, plasticity and processability of a vinyl chloride-based copolymer prepared by the above method may be significantly improved.

19 Claims, 1 Drawing Sheet

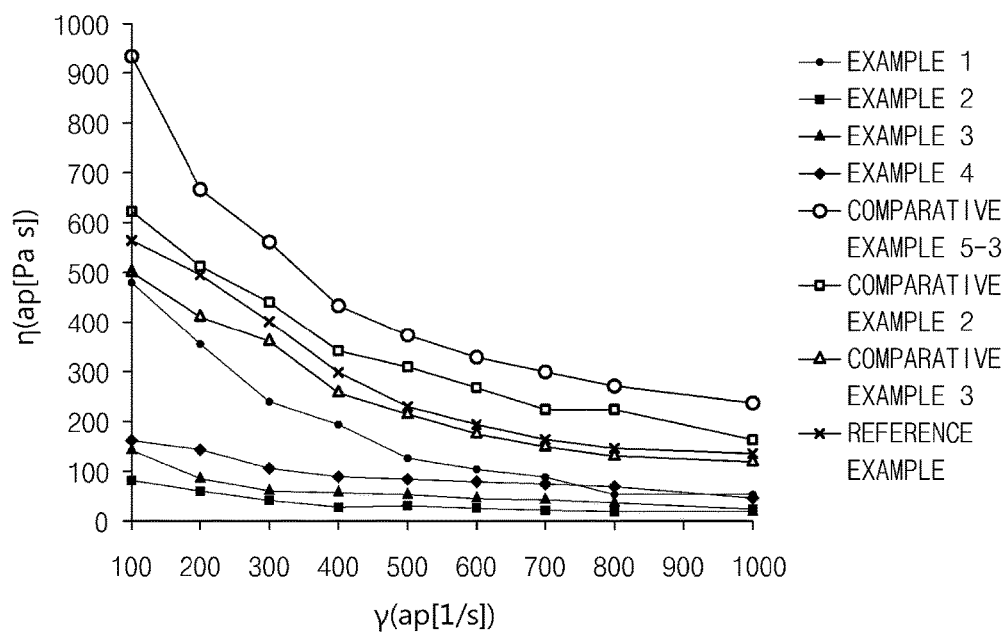

METHOD OF PREPARING VINYL CHLORIDE-BASED COPOLYMER AND VINYL CHLORIDE-BASED COPOLYMER PREPARED THEREBY

CROSS-REFERENCE TO RELATED APPLICATIONS

This application is a National Stage Entry of International Application No. PCT/KR2016/005944, filed Jun. 3, 2016, and claims the benefit of and priority to Korean Patent Application No. KR 10-2015-0080159, filed on Jun. 5, 2015, all of which are hereby incorporated by reference in their entirety for all purposes as if fully set forth herein.

TECHNICAL FIELD

The present invention relates to a method of preparing a vinyl chloride-based copolymer having excellent plasticity and processability, a vinyl chloride-based copolymer prepared thereby, a thermoplastic resin composition including the vinyl chloride-based copolymer, and a thermoplastic resin molded article prepared from the thermoplastic resin composition.

BACKGROUND ART

A vinyl chloride-based polymer is a homopolymer of vinyl chloride or a copolymer including 50% or more of vinyl chloride, wherein it has been widely used in areas, such as piping materials and building materials, due to excellent mechanical strength, weather resistance, and chemical resistance. However, since the vinyl chloride-based polymer by itself has low moldability, various additives, such as a plasticizer, are appropriately added to provide processability.

In general, the moldability of the vinyl chloride-based polymer largely depends on particle characteristics of the vinyl chloride-based polymer. Also, in order to improve productivity during the preparation of a molded article using the vinyl chloride-based polymer, there is a need to improve gelling properties, plasticizer absorbency, or powder flowability by controlling bulk density or internal porosity, a particle diameter, or particle distribution of vinyl chloride-based polymer particles.

As a typical method of improving the moldability of the vinyl chloride-based polymer, a method of improving processability of a vinyl chloride polymer itself by using a dispersion stabilizer, such as polyvinyl alcohol, during polymerization of the vinyl chloride-based polymer has been proposed. However, according to the above method, bulk specific gravity of the vinyl chloride-based polymer may be increased, but melting characteristics of the polymer may be deteriorated.

Accordingly, as a method of improving the melting characteristics as well as the processability of the vinyl chloride-based polymer, a method of controlling distribution of the degree of polymerization by changing temperature during the polymerization of the vinyl chloride-based polymer has been proposed. However, according to the above-described methods, a vinyl chloride-based polymer having high bulk density as well as improved processability may be prepared, but productivity may be reduced due to an increase in polymerization reaction time, and deterioration of physical properties of the polymer itself, for example, an increase in colorability or a decrease in mechanical properties, may occur due to a side reaction between an additive and a reactant, such as a vinyl chloride-based monomer, according to the changes in the polymerization temperature.

As another method of improving the moldability of the vinyl chloride-based polymer, a method of using a plasticizer with the vinyl chloride-based polymer during the preparation of a molded article has mainly been used. However, when the plasticizer is used as described above, since the plasticizer may move to a surface of the product, stickiness of the surface may occur and plasticity may be gradually reduced over time. In particular, with respect to a phthalate-based plasticizer mainly used, a lot of smoke may be generated during combustion, flexibility may occur at high temperature, and high energy may be required during processing.

Thus, there is a need to develop a technique which may prepare a vinyl chloride-based polymer having high processability as well as excellent mechanical properties and chemical properties.

DISCLOSURE OF THE INVENTION

Technical Problem

The present invention provides a method of preparing a vinyl chloride-based copolymer having excellent plasticity and processability.

The present invention also provides a vinyl chloride-based copolymer prepared by the above preparation method.

The present invention also provides a thermoplastic resin composition including the above vinyl chloride-based copolymer and a thermoplastic resin molded article prepared therefrom.

Technical Solution

According to an aspect of the present invention, there is provided a method of preparing a vinyl chloride-based copolymer including adding an unsaturated fatty acid ester mixture to a vinyl chloride-based monomer and performing polymerization, wherein the adding is performed by continuous addition or divided addition of at least two times at a polymerization conversion rate of 35% or less.

According to another aspect of the present invention, there is provided a vinyl chloride-based copolymer prepared by the method.

According to another aspect of the present invention, there is provided a thermoplastic resin composition including the vinyl chloride-based copolymer.

According to another aspect of the present invention, there is provided a thermoplastic resin molded article prepared from the thermoplastic resin composition.

Advantageous Effects

Since a method of preparing a vinyl chloride-based copolymer according to the present invention may improve copolymerizability with a vinyl chloride-based monomer by continuously adding or dividedly adding an unsaturated fatty acid ester mixture used as a comonomer during the time of specific polymerization conversion rate, the unreacted unsaturated fatty acid ester mixture may be reduced, and, as a result, the conversion rate of the vinyl chloride-based copolymer may be significantly improved.

Also, since the vinyl chloride-based copolymer prepared by the above preparation method according to the present invention may have an excellent conversion rate and an unsaturated fatty acid ester-derived repeating unit may be present in the vinyl chloride-based copolymer in an appropriate ratio, plasticity and processability may be significantly improved by an internal plasticizer action of the unsaturated fatty acid ester-derived repeating unit.

In addition, a thermoplastic resin composition including the vinyl chloride-based copolymer may have excellent plasticity and processability, and thus, a thermoplastic molded article prepared from the composition may have excellent mechanical properties as well as excellent moldability.

Therefore, the method of preparing a vinyl chloride-based copolymer according to the present invention and the vinyl chloride-based copolymer prepared thereby may be suitable for industries that need them, for example, industries that utilize a vinyl chloride polymer.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a graph illustrating the results of comparative analysis of melt viscosity of a vinyl chloride-based copolymer according to an embodiment of the present invention.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method of preparing a vinyl chloride-based copolymer having a high polymerization conversion rate as well as excellent plasticity and processability.

The preparation method according to an embodiment of the present invention includes adding an unsaturated fatty acid ester mixture to a vinyl chloride-based monomer and performing polymerization (step A), wherein the adding is performed by continuous addition or divided addition of at least two times at a polymerization conversion rate of 35% or less.

The expression "at least" used in the present invention denotes a minimum value, and, for example, the expression "at least 2 times" may denote a minimum of 2 times or 2 times or more.

The step A is a step for forming a vinyl chloride-based copolymer by polymerization of the vinyl chloride-based monomer and the unsaturated fatty acid ester mixture, and the step A may be performed by adding the unsaturated fatty acid ester mixture to the vinyl chloride-based monomer and performing polymerization.

The vinyl chloride-based monomer may be a vinyl chloride monomer alone or a combination of a vinyl chloride monomer and a vinyl-based monomer copolymerizable therewith, and, in a case in which the vinyl chloride-based monomer is the combination of the vinyl chloride monomer and the vinyl-based monomer, a ratio may be adjusted to include vinyl chloride in an amount of 50% or more in the finally prepared vinyl chloride-based copolymer.

The vinyl-based monomer copolymerizable with the vinyl chloride monomer, for example, may be an olefin compound such as ethylene, propylene, and butane; vinyl esters such as vinyl acetate, vinyl propionate, and vinyl stearate; unsaturated nitriles such as acrylonitrile; vinyl alkyl ethers such as vinyl methyl ether, vinyl ethyl ether, vinyl octyl ether, and vinyl lauryl ether; halogenated vinylidenes such as vinylidene chloride; an unsaturated fatty acid, such as acrylic acid, methacrylic acid, itaconic acid, maleic acid, fumaric acid, maleic anhydride, and itaconic anhydride, and anhydrides of these fatty acids; unsaturated fatty acid esters such as methyl acrylate, ethyl acrylate, monomethyl maleate, dimethyl maleate, and butyl benzyl maleate; and a crosslinkable monomer such as diallyl phthalate, and the vinyl-based monomer may be used alone or in a mixture of two or more thereof.

The unsaturated fatty acid ester mixture may be a mixture of a cis isomer and a trans isomer of an unsaturated fatty acid ester, and, in this case, the cis isomer and the trans isomer of the unsaturated fatty acid ester in the mixture may have a weight ratio of 60:40 to 99:1. Specifically, the cis isomer and the trans isomer of the unsaturated fatty acid ester may have a weight ratio of 65:35 to 90:10, particularly 65:35 to 80:20, and more particularly 9:1.

Specifically, the unsaturated fatty acid ester mixture according to an embodiment of the present invention is used as a comonomer copolymerized with the vinyl chloride-based monomer, wherein the unsaturated fatty acid ester mixture may act as an internal plasticizer by forming a vinyl chloride-based copolymer through the copolymerization with the vinyl chloride-based monomer and thus, may improve the plasticity and processability of the vinyl chloride-based copolymer.

As described above, the cis isomer and the trans isomer of the unsaturated fatty acid ester may be mixed in the unsaturated fatty acid ester mixture. The cis isomer of the unsaturated fatty acid ester exhibits excellent reactivity, and the trans isomer of the unsaturated fatty acid ester has properties favorable for copolymerization. Thus, in order to prepare a vinyl chloride-based copolymer having excellent plasticity and processability, there is a need to adjust the ratio of the cis isomer to the trans isomer of the unsaturated fatty acid ester in the unsaturated fatty acid ester mixture used as the comonomer, and the preparation method according to the embodiment of the present invention may improve the plasticity and processability of the finally prepared vinyl chloride-based copolymer by adjusting the ratio of the cis isomer to the trans isomer of the unsaturated fatty acid ester in the unsaturated fatty acid ester mixture within the above-described range. If the ratio of the cis isomer to the trans isomer in the unsaturated fatty acid ester mixture is outside the above range and the ratio of the trans isomer is increased, there is a possibility that a phenomenon of agglomeration of the trans isomers may occur instead of the formation of the copolymer by the polymerization with the vinyl chloride-based monomer.

Herein, the unsaturated fatty acid ester may be an unsaturated dicarboxylic acid ester. Specifically, the cis isomer of the unsaturated fatty acid ester may be a compound represented by the following Formula 1, and the trans isomer of the unsaturated fatty acid ester may be a compound represented by the following Formula 2.

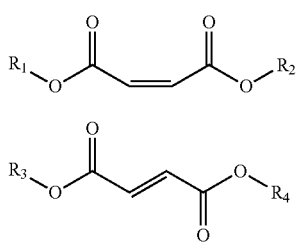

[Formula 1]

[Formula 2]

In Formulae 1 and 2, $R_1$ to $R_4$ may each independently be selected from the group consisting of an alkyl group having 2 to 16 carbon atoms, a cycloalkyl group having 3 to 16 carbon atoms, and a combination thereof.

In the present invention, the expression "a combination thereof", unless specially mentioned otherwise, may denote that two or more functional groups are bonded by a single bond, a double bond (ethylene group), a triple bond (acetylene group) or a linking group such as an alkylene group having 1 to 20 carbon atoms (e.g., methylene group (—$CH_2$), ethylene group (—$CH_2CH_2$—), etc.), or two or more functional groups are connected by condensation.

Specifically, the cis isomer and the trans isomer of the unsaturated fatty acid ester may be dibutyl maleate and dibutyl fumarate; dihexyl maleate and dihexyl fumarate; di(2-ethylhexyl) maleate and di(2-ethylhexyl) fumarate; di(ethyldodecyl) maleate and di(ethyldodecyl) fumarate; didecyl maleate and didecyl fumarate; diundecyl maleate and diundecyl fumarate; didodecyl maleate and didodecyl fumarate; or ditridecyl maleate and ditridecyl fumarate.

Also, as described above in the preparation method according to the embodiment of the present invention, the polymerization may be performed by continuously adding or dividedly adding the unsaturated fatty acid ester mixture in two or more portions to the vinyl chloride-based monomer at a polymerization conversion rate of 35% or less, and specifically, the unsaturated fatty acid ester mixture may be added at a polymerization conversion rate of 35% or less after initiation of the polymerization. If the polymerization is performed by adding the unsaturated fatty acid ester mixture with the vinyl chloride-based monomer to a reactor before the initiation of the polymerization, the unsaturated fatty acid ester mixture added as the comonomer may not form a copolymer with the vinyl chloride-based monomer, but the unsaturated fatty acid ester mixture by itself may form a polymer, and thus, a conversion rate to the vinyl chloride-based copolymer may be reduced. In contrast, in a case in which the unsaturated fatty acid ester mixture is added (continuously added or dividedly added) at a polymerization conversion rate of greater than 35%, the unsaturated fatty acid ester mixture may not stably form a copolymer with the vinyl chloride-based monomer, but may remain as an unreacted monomer. Herein, the polymerization conversion rate may represent a polymerization conversion rate of the vinyl chloride-based monomer.

The polymerization conversion rate may be measured by using a butane tracer equipped with gas chromatography. Specifically, a polymerization conversion curve according to the ratio of the vinyl chloride-based monomer to butane with time under predetermined polymerization conditions is drawn for each polymerization condition, and the polymerization conversion rate according to each polymerization condition may be measured on the basis of the curve. Also, the polymerization conversion rate may include a tolerance of the measurement, and, for example, may include up to ±2% from 35%.

Specifically, the continuous addition may be performed in such a manner that the addition is started when the polymerization conversion rate is 1% or more, the addition is terminated when the polymerization conversion rate is 35% or less, and an entire amount of the mixture used is added at a constant rate from the start to the termination of the addition. That is, the rate of the addition may be appropriately controlled so that the entire amount of the mixture used in the polymerization is constantly and continuously added during which the polymerization conversion rate is within the above range. Herein, the polymerization conversion rate of 1% may denote the time of reaching a polymerization initiation temperature, and that is, the unsaturated fatty acid ester mixture may be added immediately after the initiation of the polymerization or simultaneously with the initiation of the polymerization.

Also, the divided addition may be performed in such a manner that a first fraction of the entire amount of the mixture is primarily added when the polymerization conversion rate is in a range of 1% to 15%, and a remaining second fraction, excluding the first fraction, of the entire amount of the mixture is secondarily added when the polymerization conversion rate is in a range of 25% to 35%. In this case, the first fraction and the second fraction may be adjusted to have a weight ratio of 9:1 to 1:9. Furthermore, the addition may be divided into a number of inputs, for example, at least two times, three times, and four times, fractions may be formed in a number equal to the number of times of the additions, and each fraction may be adjusted to have an appropriate ratio depending on the purpose. In this case, the number of times of the addition is not particularly limited as long as it is at least two times, but it may be in a range of at least 2 times to 20 times or less.

In the preparation method according to the embodiment of the present invention, since the unsaturated fatty acid ester mixture may be continuously added or dividedly added during the time of specific polymerization conversion rate (after the initiation of the polymerization, 35% or less) as described above, the vinyl chloride-based monomer and the unsaturated fatty acid ester mixture may stably form a copolymer. Thus, the conversion rate to the vinyl chloride-based copolymer may be improved and, as a result, a vinyl chloride-based copolymer having excellent plasticity and processability may be prepared.

Also, the polymerization according to an embodiment of the present invention may be performed by suspension polymerization in a solvent in the presence of a polymerization initiator and a protective colloid auxiliary. That is, the preparation method according to the embodiment of the present invention may be a preparation method by suspension polymerization.

Specifically, the polymerization may be performed by the addition of the unsaturated fatty acid ester mixture to a polymerization reactor including the vinyl chloride-based monomer and suspension polymerization. In this case, the polymerization reactor may be a filled reactor in which the solvent, the polymerization initiator, and the protective colloid auxiliary are filled before the vinyl chloride-based monomer is included. Herein, the expression "filled reactor" may denote a state in which the solvent, the polymerization initiator, and the protective colloid auxiliary have been introduced into the polymerization reactor before the vinyl chloride-based monomer is included.

The unsaturated fatty acid ester mixture may be added in an amount of 3 parts by weight to 53 parts by weight based on 100 parts by weight of the vinyl chloride-based monomer, and the ratio of the cis isomer to the trans isomer of the unsaturated fatty acid ester in the mixture may be in the above-described range. Specifically, the unsaturated fatty acid ester mixture may be added in an amount of 20 parts by weight to 50 parts by weight based on 100 parts by weight of the vinyl chloride-based monomer. In a case in which the unsaturated fatty acid ester mixture is used within the above range of parts by weight, a vinyl chloride-based monomer-derived repeating unit and an unsaturated fatty acid ester mixture-derived repeating unit in the finally prepared vinyl chloride-based copolymer may have a ratio in the range as described below.

The solvent may be deionized water, wherein an amount of the solvent used may be appropriately adjusted according to a size of the polymerization reactor and an amount of the monomer used, and, for example, may be 70 parts by weight or more based on 100 parts by weight of a total monomer including the vinyl chloride-based monomer and unsaturated fatty acid ester mixture (comonomer) that are used in the polymerization or may be 90 parts by weight or more based on 100 parts by weight of the vinyl chloride-based monomer.

The protective colloid auxiliary functions to stabilize reactants and allow uniform and stable particles to be formed during the polymerization, wherein the protective colloid auxiliary may be used in an amount of 0.03 part by weight to 5 parts by weight based on 100 parts by weight of the total monomer including the vinyl chloride-based monomer and unsaturated fatty acid ester mixture (comonomer) that are used in the polymerization. Specifically, the protective colloid auxiliary may be used in an amount of 0.05 part by weight to 2.5 parts by weight based on 100 parts by weight of the total monomer. If the protective colloid auxiliary is used in an amount of less than 0.03 part by weight, since a size of the particles is excessively increased, fish-eye may occur. In a case in which the protective colloid auxiliary is used in an amount of greater than 5 parts by weight, initial colorability may be reduced due to an increase in fine particles.

The protective colloid auxiliary may be one selected from the group consisting of a vinyl alcohol-based resin, cellulose, and an unsaturated organic acid polymer, or a mixture of two thereof, and, specifically, the protective colloid auxiliary may be a mixture in which the vinyl alcohol-based resin and the cellulose are mixed in a weight ratio of 5:1 to 7:7. In other words, the weight ratio of the vinyl alcohol-based resin to the cellulose may be 5 to 7:1 to 7. Also, the vinyl alcohol-based resin may be a mixture in which a first polyvinyl alcohol having a degree of hydration of greater than 50 wt % and equal to or less than 90 wt % and a second polyvinyl alcohol having a degree of hydration of 30 wt % to 50 wt % are mixed in a weight ratio of 2:1 to 1:2.

Furthermore, the cellulose may include methyl cellulose, hydroxyethylcellulose, or hydroxypropylmethylcellulose, and any one thereof or a mixture of two or more thereof may be used. Among these, the cellulose may be hydroxypropylmethylcellulose, and, for example, an amount of a hydroxypropyl group in the molecule may be in a range of 3 wt % to 20 wt % and viscosity of 2% aqueous solution at 23±5° C. may be in a range of 10 cps to 20,000 cps.

Also, the unsaturated organic acid polymer may include an acrylic acid polymer, a methacrylic acid polymer, an itaconic acid polymer, a fumaric acid polymer, a maleic acid polymer, or a succinic acid polymer, and any one thereof or a mixture of two or more thereof may be used.

The polymerization initiator may be used in an amount of 0.02 part by weight to 0.2 part by weight based on 100 parts by weight of the total monomer including the vinyl chloride-based monomer and unsaturated fatty acid ester mixture (comonomer) that are used in the polymerization. Specifically, the polymerization initiator may be used in an amount of 0.04 part by weight to 0.12 part by weight based on 100 parts by weight of the total monomer. If the amount of the polymerization initiator is less than 0.02 part by weight, since polymerization reaction time may be increased and the conversion rate to the vinyl chloride-based copolymer may be decreased, productivity may be reduced. If the amount of the polymerization initiator is greater than 0.2 part by weight, since the polymerization initiator may not be completely consumed during the polymerization but may remain in the finally prepared vinyl chloride-based copolymer, physical properties, particularly thermal stability, of the copolymer may be reduced.

The polymerization initiator is not particularly limited, but, for example, may include a peroxide-based compound such as dicumyl peroxide, dipentyl peroxide, di-3,5,5-trimethyl hexanoyl peroxide, or dilauryl peroxide; a peroxydicarbonate-based compound such as diisopropyl peroxydicarbonate, di-sec-butyl peroxydicarbonate, or di-2-ethylhexyl peroxydicarbonate; a peroxyester-based compound such as t-butyl peroxypivalate, 1,1,3,3-tetramethylbutyl peroxyneodecanoate, or t-butyl peroxyneodecanoate; an azo-based compound such as azobis-2,4-dimethylvaleronitrile; a hydroperoxide-based compound such as t-butyl hydroperoxide; or a sulfate-based compound such as potassium persulfate or ammonium persulfate, and any one thereof or a mixture of two or more thereof may be used.

The suspension polymerization is not particularly limited, but, for example, may be performed in a temperature range of 30° C. to 70° C., and the temperature during the suspension polymerization may be appropriately adjusted within the above range according to a desired degree of polymerization. For example, the higher the desired degree of polymerization is, the lower the temperature may be, and the lower the desired degree of polymerization is, the higher the temperature may be.

In the suspension polymerization, the polymerization may be terminated by adding a reaction terminator, and the termination point may be a point at which a pressure in the reactor is in a range of 6 k g/cm² to 8 kg/cm² (or point at which the polymerization conversion rate is greater than 95%).

The reaction terminator is not particularly limited, but, for example, may include a phenolic compound, an amine compound, a nitrile compound, or a sulfur compound. Specifically, the reaction terminator may be at least one selected from the group consisting of a phenolic compound such as triethylene glycol-bis-3-(3-t-butyl-4-hydroxy-5-methylphenyl)propionate, hydroquinone, p-methoxy phenol, t-butyl hydroxyanisole, n-octadecyl-3-(4-hydroxy-3,5-di-t-butylphenyl)propionate, 2,5-di-t-butylhydroquinone, 4,4'-butylidenebis(3-methyl-6-t-butylphenol), t-butyl catechol, 4,4'-thiobis(6-t-butyl-m-cresol), and tocopherol, an amine compound such as N,N'-diphenyl-p-phenylenediamine and 4,4'-bis(dimethylbenzyl)diphenylamine, a nitrile compound such as 2-phenyl nitronyl nitroxide, 3-imidazoline nitroxide, and 4-hydroxy-2,2',6,6'-tetramethyl-piperidine-1-oxyl, and a sulfur compound such as dodecyl mercaptan and 1,2-diphenyl-2-thiol.

Also, in the suspension polymerization, an additive, such as a polymerization regulator, a chain transfer agent, a pH adjuster, an antioxidant, a cross-linking agent, an antistatic agent, a scale inhibitor, and a surfactant, may be further added as needed in addition to the above-described active ingredients, and type and amount of the additive are not particularly limited and the type and amount known in the art may be used. The additive may be added at any point, for example, at the beginning of the suspension polymerization, in the middle of the polymerization, or after the polymerization, and may be added collectively or continuously.

The preparation method according to the present invention may further include drying after the step A, and the drying is not particularly limited and may be performed by a method known in the art.

Also, the present invention provides a vinyl chloride-based copolymer prepared by the above-described preparation method.

Since the vinyl chloride-based copolymer according to an embodiment of the present invention is prepared by the above-described preparation method, the vinyl chloride-based copolymer may include 65 wt % to 97 wt % of the vinyl chloride-based monomer-derived repeating unit; and 3 wt % to 35 wt % of the unsaturated fatty acid ester-derived repeating unit. Furthermore, the unsaturated fatty acid ester-derived repeating unit may include a repeating unit derived from the cis isomer of the unsaturated fatty acid ester and a repeating unit derived from the trans isomer of the unsaturated fatty acid ester in a weight ratio of 60:40 to 99:1. Specifically, the vinyl chloride-based copolymer may include the vinyl chloride-based monomer-derived repeating unit in an amount of 65 wt % to 80 wt % and may include the unsaturated fatty acid ester-derived repeating unit in an amount of 20 wt % to 35 wt %.

In a case in which the amount of the vinyl chloride-based monomer-derived repeating unit in the vinyl chloride-based copolymer is greater than 97 wt % and the amount of the unsaturated fatty acid ester-derived repeating unit is less than 3 wt %, a reverse plasticization phenomenon may occur, and thus, mechanical properties of the vinyl chloride-based copolymer may be deteriorated. In contrast, in a case in which the amount of the vinyl chloride-based monomer-derived repeating unit in the vinyl chloride-based copolymer is less than 65 wt % and the amount of the unsaturated fatty acid ester-derived repeating unit is greater than 35 wt %, the plasticity may be reduced and the mechanical properties may be deteriorated due to the excessive unsaturated fatty acid ester-derived repeating unit.

Also, the vinyl chloride-based copolymer according to the embodiment of the present invention may be in the form of a secondary particle in which primary particles are assembled, wherein the vinyl chloride-based copolymer has an average pore diameter of 100 nm or less and a porosity of 40 vol % or less. Specifically, the pores may have an average pore diameter of 60 nm or less, particularly 1 nm to 20 nm, and more particularly 10 nm to 20 nm. Furthermore, the vinyl chloride-based copolymer may include the pores having the above average pore diameter in an amount of 30 vol % or less, particularly 20 vol % or less, and more particularly 18 vol % or less based on a total volume of the secondary particles.

Since the vinyl chloride-based copolymer according to the embodiment of the present invention includes the unsaturated fatty acid ester-derived repeating unit and the unsaturated fatty acid ester-derived repeating unit is derived from the above-described unsaturated fatty acid ester mixture, the unsaturated fatty acid ester mixture may act an internal plasticizer to reduce the size and porosity of the pores in the vinyl chloride-based copolymer particles. Accordingly, the vinyl chloride-based copolymer according to the embodiment of the present invention may have relatively fine pores in comparison to a typical vinyl chloride-based polymer and may simultaneously have a relatively low porosity, and thus, excellent processability may be obtained.

In the present invention, surface void ($P_{inter}$), accessible intravoid ($P_{acc}$), and inaccessible intravoid ($P_{inacc}$) were respectively measured from amounts of mercury intruded into the copolymer particles by using a mercury porosimeter, specifically Auto Pore IV 9520 (Micrometrics Instrument Corporation), and the average pore diameter (4 V/A) and porosity of the vinyl chloride-based copolymer may be calculated from the measurement results.

Also, the vinyl chloride-based copolymer according to the embodiment of the present invention may have a low cold plasticizer absorption (CPA) of 10 wt % or less, particularly 7 wt % or less, and more particularly 1 wt % to 3 wt % due to an internal plasticization effect caused by the unsaturated fatty acid ester-derived repeating unit. In this case, the cold plasticizer absorption may represent an amount of the plasticizer, specifically dioctyl phthalate, absorbed in a vinyl chloride-based copolymer sample as wt % with respect to the vinyl chloride-based copolymer sample before the absorption according to ASTM D2396 and ISO 4574, and specifically, the cold plasticizer absorption was measured under conditions of 3,900 rpm and 20° C. by using a Continent 512-R instrument by Hanil Science Industrial Co., Ltd.

The vinyl chloride-based copolymer according to the embodiment of the present invention may have a narrow molecular weight distribution in which a polydispersity (PDI), a ratio (Mw/Mn) of a weight-average molecular weight (Mw) to a number-average molecular weight (Mn), is in a range of 1.5 to 2.5. If the PDI of the vinyl chloride-based copolymer is greater than 2.5, mechanical properties, such as wear resistance and impact resistance, may be deteriorated. Also, in consideration of significant improvement in the mechanical properties of the copolymer according to the control of the polydispersity, the polydispersity of the vinyl chloride-based copolymer may specifically be in a range of 1.8 to 2.1.

Also, the vinyl chloride-based copolymer according to the embodiment of the present invention may have a weight-average molecular weight (Mw) of 70,000 g/mol to 300,000 g/mol, for example, 90,000 g/mol to 280,000 g/mol.

Furthermore, the vinyl chloride-based copolymer according to the embodiment of the present invention may have a number-average molecular weight (Mn) of 50,000 g/mol to 150,000 g/mol, for example, 50,000 g/mol to 90,000 g/mol.

If the weight-average molecular weight or the number-average molecular weight of the vinyl chloride-based copolymer is outside the above range or the above-described polydispersity range, the processability and mechanical properties may not be balancedly improved. Herein, each of the weight-average molecular weight and the number-average molecular weight may be a polystyrene-equivalent molecular weight analyzed by gel permeation chromatography (GPC).

Also, the vinyl chloride-based copolymer according to the embodiment of the present invention may exhibit excellent plasticizing performance by having low hardness. Specifically, the vinyl chloride-based copolymer may have a hardness of 50 HS to 110 HS when measured according to ASTM D2240, and, for example, may have a hardness of 50 HS to 80 HS. A specific measurement method may be the same as that described in an experimental example below.

In addition, the present invention provides a thermoplastic resin composition including the vinyl chloride-based copolymer.

The thermoplastic resin composition according to an embodiment of the present invention may have a melt viscosity of 25 Pa·s to 130 Pa·s under conditions of a shear rate of 500 $s^{-1}$ and a temperature of 160° C. In this case, the melt viscosity is a value obtained by measuring viscoelastic behavior of a thermoplastic resin composition, which is prepared by mixing 3 parts by weight of a tin-based stabilizer and 1 part by weight of a stearyl-based lubricant with 100 parts by weight of the vinyl chloride-based copolymer, by using a Rheo-tester 2000 (Göttfert GmbH). Since the thermoplastic resin composition includes the vinyl chloride-based copolymer including the unsaturated fatty acid ester-derived repeating unit, the thermoplastic resin composition may have a relatively lower melt viscosity than a thermoplastic resin composition including a typical vinyl chloride-based polymer or vinyl chloride-based copolymer, and thus, processability may be excellent. This may mean that melt viscosity characteristics of the vinyl chloride-based copolymer according to the embodiment of the present invention may be better than those of the typical vinyl chloride-based polymer or vinyl chloride-based copolymer.

Furthermore, the present invention provides a thermoplastic resin molded article prepared from the thermoplastic resin composition.

Since the thermoplastic resin molded article according to an embodiment of the present invention is prepared from the thermoplastic resin composition, processing characteristics may be excellent, and accordingly, surface properties may be excellent.

Hereinafter, the present invention will be described in more detail, according to specific examples and experimental examples. However, the following examples and experimental examples are merely presented to exemplify the present invention, and the scope of the present invention is not limited thereto.

Example 1

390 kg of deionized water was added to a reactor having an internal volume of 1 $m^3$ and equipped with a reflux condenser, 160 g of polyvinyl alcohol having a degree of hydration of 80.5%, 120 g of polyvinyl alcohol having a degree of hydration of 42.3%, and 50 g of hydroxypropyl methylcellulose were added to the reactor, and 300 kg of a vinyl chloride monomer was added thereto. Then, 60 g of di-2-ethylhexyl peroxydicarbonate and 150 g of t-butyl peroxyneodecanoate were added to initiate a reaction. When a polymerization conversion rate of the vinyl chloride monomer was 20%, a mixture of dibutyl maleate and dibutyl fumarate began to be added to the reactor and the addition was terminated when the polymerization conversion rate was 35%. In this case, a total amount of the mixture of dibutyl maleate and dibutyl fumarate was 60 kg, and the mixture was continuously added while the addition was controlled to have an appropriate rate so that the mixture may be added in a constant amount from the beginning to the end of the addition. Also, a weight ratio of the dibutyl maleate to the dibutyl fumarate in the mixture was 9:1. In order to achieve an average degree of polymerization of 1,000, a reaction temperature was maintained at 57° C. during an entire process of the polymerization reaction, and, when an internal pressure of the reactor reached 6.3 kg/$cm^2$, 15 g of 4-hydroxy-2,2,6,6-tetramethyl-piperidine-1-oxyl and 90 g of triethylene glycol-bis-3-(3-t-butyl-4-hydroxy-5-methylphenyl)propionate were added to terminate the reaction. Thereafter, the unreacted monomer and a copolymer slurry generated were separation recovered, and the recovered copolymer slurry was dried in a fluidized bed dryer to obtain a vinyl chloride-based copolymer.

The polymerization conversion rate was measured by using a butane tracer equipped with gas chromatography. Specifically, a polymerization conversion curve according to the ratio of the vinyl chloride-based monomer to butane with time under predetermined polymerization conditions was drawn for each polymerization condition, and the polymerization conversion rate according to each polymerization condition was measured.

Example 2

350 kg of deionized water was added to a reactor having an internal volume of 1 $m^3$ and equipped with a reflux condenser, 108 g of polyvinyl alcohol having a degree of hydration of 80.5%, 162 g of polyvinyl alcohol having a degree of hydration of 42.3%, and 45 g of hydroxypropyl methylcellulose were added to the reactor, and 270 kg of a vinyl chloride monomer was added thereto. Then, 81 g of dicumyl peroxide and 108 g of t-butyl peroxyneodecanoate were added to initiate a reaction. Immediately after the initiation of the polymerization, a mixture of dibutyl maleate and dibutyl fumarate began to be added to the reactor and the addition was terminated when the polymerization conversion rate was 30%. In this case, a total amount of the mixture of dibutyl maleate and dibutyl fumarate was 135 kg, and the mixture was continuously added while the addition was controlled to have an appropriate rate so that the mixture may be added in a constant amount from the beginning to the end of the addition. Also, a weight ratio of the dibutyl maleate to the dibutyl fumarate in the mixture was 9:1. In order to achieve an average degree of polymerization of 1,300, a reaction temperature was maintained at 52° C. during an entire process of the polymerization reaction, and, when an internal pressure of the reactor reached 5.7 kg/$cm^2$, 13.5 g of 4-hydroxy-2,2,6,6-tetramethyl-piperidine-1-oxyl and 108 g of triethylene glycol-bis-3-(3-t-butyl-4-hydroxy-5-methylphenyl)propionate were added to terminate the reaction. Thereafter, the unreacted monomer and a copolymer slurry generated were separation recovered, and the recovered copolymer slurry was dried in a fluidized bed dryer to obtain a vinyl chloride-based copolymer.

The polymerization conversion rate was measured by the same method as described above.

Example 3

A vinyl chloride-based copolymer was obtained in the same manner as in Example 1 except that the addition of the mixture began when the polymerization conversion rate was 10%, the addition was terminated when the polymerization conversion rate was 30%, and a total amount of the mixture added was controlled to be 90 kg.

Example 4

390 kg of deionized water was added to a reactor having an internal volume of 1 $m^3$ and equipped with a reflux condenser, 160 g of polyvinyl alcohol having a degree of hydration of 80.5%, 120 g of polyvinyl alcohol having a degree of hydration of 42.3%, and 50 g of hydroxypropyl methylcellulose were added to the reactor, and 300 kg of a vinyl chloride monomer was added thereto. Then, 60 g of di-2-ethylhexyl peroxydicarbonate and 150 g of t-butyl peroxyneodecanoate were added to initiate a reaction. When a polymerization conversion rate was 1%, 60 kg of a mixture of dibutyl maleate and dibutyl fumarate was primarily added to perform a polymerization reaction, and, when the polymerization conversion rate was 25%, 30 kg of the mixture of dibutyl maleate and dibutyl fumarate was secondarily added to continuously perform the polymerization reaction. A weight ratio of the dibutyl maleate to the dibutyl fumarate in the mixture was 9:1. In order to achieve an average degree of polymerization of 1,000, a reaction temperature was maintained at 57° C. during an entire process of the polymerization reaction, and, when an internal pressure of the reactor reached 6.3 kg/cm$^2$, 15 g of 4-hydroxy-2,2,6,6-tetramethyl-piperidine-1-oxyl and 90 g of triethylene glycol-bis-3-(3-t-butyl-4-hydroxy-5-methylphenyl)propionate were added to terminate the reaction. Thereafter, the unreacted monomer and a copolymer slurry generated were separation recovered, and the recovered copolymer slurry was dried in a fluidized bed dryer to obtain a vinyl chloride-based copolymer.

The polymerization conversion rate was measured by the same method as described above.

Reference Example

A vinyl chloride-based copolymer was obtained in the same manner as in Example 1 except that a polymerization reaction was performed by collectively adding 60 kg of a mixture of dibutyl maleate and dibutyl fumarate with a vinyl chloride monomer before the initiation of the polymerization.

Comparative Example 1

A vinyl chloride-based polymer was obtained in the same manner as in Example 1 except that a mixture of dibutyl maleate and dibutyl fumarate was not used.

Comparative Example 2

A vinyl chloride-based copolymer was obtained in the same manner as in Example 1 except that a mixture of dibutyl maleate and dibutyl fumarate began to be added when a polymerization conversion rate was 40% and the addition was terminated when the polymerization conversion rate was 60%.

Comparative Example 3

A vinyl chloride-based copolymer was obtained in the same manner as in Example 3 except that a mixture of dibutyl maleate and dibutyl fumarate began to be added when a polymerization conversion rate was 35% and the addition was terminated when the polymerization conversion rate was 50%.

Comparative Example 4

A vinyl chloride-based copolymer was obtained in the same manner as in Example 4 except that, when a polymerization conversion rate was 35%, 60 kg of a mixture of dibutyl maleate and dibutyl fumarate was primarily added to perform a polymerization reaction, and, when the polymerization conversion rate was 50%, 30 kg of the mixture of dibutyl maleate and dibutyl fumarate was secondarily added to continuously perform the polymerization reaction.

Comparative Examples 5-1 to 5-8

Dioctyl phthalate (DOP), as an external plasticizer, was added to 100 parts by weight of the vinyl chloride-based polymer polymerized in Comparative Example 1 in various amounts as listed in the following Table 1 and blended to obtain vinyl chloride-based polymers and plasticized products.

TABLE 1

| Category | Amount of dioctyl phthalate used (parts by weight) |
|---|---|
| Comparative Example 5-1 | 20 |
| Comparative Example 5-2 | 30 |
| Comparative Example 5-3 | 40 |
| Comparative Example 5-4 | 50 |
| Comparative Example 5-5 | 60 |
| Comparative Example 5-6 | 70 |
| Comparative Example 5-7 | 80 |
| Comparative Example 5-8 | 90 |

Experimental Example 1

With respect to the vinyl chloride-based copolymers prepared in Examples 1 to 4, Comparative Example 2, Comparative Example 3, Comparative Example 4, and Reference Example, in order to comparatively analyze conversion rates to copolymer, an amount of an unsaturated fatty acid ester-derived repeating unit in each vinyl chloride-based copolymer was analyzed by LC/ELSD analysis, and an amount and a conversion rate of an unreacted comonomer were measured based on this result.

Specifically, 1 g of each of the vinyl chloride-based copolymers prepared in Examples 1 to 4, Comparative Example 2, Comparative Example 3, Comparative Example 4, and Reference Example was weighed and dissolved in 10 ml of THF, and the solution was then precipitated with 30 ml of methanol. Thereafter, sonication was performed to extract the additives, and each supernatant was then taken and filtered (filter used: 0.2 μm disc syringe filter). Each supernatant obtained was analyzed by using ALS (Auto liquid Sampler)/GC-MSD (gas chromatography-mass spectrometry) (Agilent 6890N GC-MSD)/FID (Flame Ionization Detector, Agilent technologies). The results thereof are presented in Table 2 below.

TABLE 2

| Category | Amount of unreacted comonomer (parts by weight) | Conversion rate (%) |
|---|---|---|
| Example 1 | 3.34 | 83.3 |
| Example 2 | 8.50 | 83.0 |
| Example 3 | 4.86 | 83.8 |
| Example 4 | 5.07 | 83.1 |
| Reference Example | 4.30 | 78.5 |
| Comparative | 12.44 | 37.8 |

TABLE 2-continued

| Category | Amount of unreacted comonomer (parts by weight) | Conversion rate (%) |
|---|---|---|
| Example 2 | | |
| Comparative Example 3 | 11.62 | 61.3 |
| Comparative Example 4 | 14.58 | 48.6 |

As illustrated in Table 2, the conversion rates of the vinyl chloride-based copolymers of Examples 1 to 4 prepared by the preparation method according to the embodiment of the present invention were significantly higher than those of the vinyl chloride-based copolymers of Comparative Examples 2 to 4, and the vinyl chloride-based copolymers of Examples 1 to 4 also exhibited higher conversion rates when compared with the vinyl chloride-based copolymer of Reference Example.

Specifically, the vinyl chloride-based copolymer of Example 1, in which the unsaturated fatty acid ester mixture was used at the same ratio (20 parts by weight based on the vinyl chloride monomer), but was continuously added during the time of specific polymerization conversion rate, had a high conversion rate of 83.3%, but the vinyl chloride-based copolymer of Comparative Example 2, which was prepared by the continuous addition of the mixture when the polymerization conversion rate range was exceeded, had a significantly low conversion rate, a level of 45% of the conversion rate of the vinyl chloride-based copolymer of Example 1. Also, the vinyl chloride-based copolymers of Examples 3 and Comparative Example 3 were prepared by using the unsaturated fatty acid ester mixture at the same ratio (30 parts by weight based on the vinyl chloride monomer), but the conversion rate of the vinyl chloride-based copolymer of Examples 3 was about 1.4 times higher than that of the vinyl chloride-based copolymer of Comparative Example 3. In addition, the vinyl chloride-based copolymers of Examples 4 and Comparative Example 4 were prepared by using the unsaturated fatty acid ester mixture at the same ratio (30 parts by weight based on the vinyl chloride monomer) and the divided addition of the mixture, but the conversion rate of the vinyl chloride-based copolymer of Examples 4, in which the mixture was added at the polymerization conversion rate suggested in the present invention, was about 1.7 times higher than that of the vinyl chloride-based copolymer of Comparative Example 4 in which the mixture was added when the conversion rate was outside the above polymerization conversion rate. It was confirmed that the conversion rate of the vinyl chloride-based copolymer of Examples 4 was increased by about 6% in comparison to the conversion rate of the vinyl chloride-based copolymer of Reference Example which was prepared by suspension polymerization through the addition of the unsaturated fatty acid ester mixture with the vinyl chloride monomer before the initiation of the polymerization instead of the continuous addition or divided addition of the unsaturated fatty acid ester mixture at the time of specific polymerization conversion rate.

As confirmed by the above results, the conversion rate of the vinyl chloride-based copolymer prepared by the preparation method according to the embodiment of the present invention may be obviously improved. That is, the preparation method according to the embodiment of the present invention may facilitate the copolymerization of the unsaturated fatty acid ester mixture with the vinyl chloride monomer by continuously adding the unsaturated fatty acid ester mixture used as a comonomer during the time of specific polymerization conversion rate or dividedly adding the mixture in two or more portions at the specific polymerization conversion rate.

Experimental Example 2

In order to comparatively analyze plasticizing performances of the vinyl chloride-based copolymers of Examples 1 to 4, Comparative Example 2, Comparative Example 3, Comparative Example 4, and Reference Example and the plasticized products of Comparative Examples 5-1 to 5-8, hardness characteristics (Rockwell) were measured. The hardness was measured according to ASTM D2240, wherein, after a hardness-tester (Shore A) stylus was fully lowered down to one position of each sheet, a hardness value appeared after 5 seconds was recorded, tests were performed on 3 positions for each sheet, and an average hardness value was then calculated. In this case, each sheet was fabricated from each of the vinyl chloride-based copolymers and plasticized products to a thickness of 6 mm by using a press. The results thereof are presented in Table 3 below.

TABLE 3

| Category | External plasticizer amount (parts by weight) | External plasticizer equivalent amount (%) | Hardness (HS) |
|---|---|---|---|
| Example 1 | — | 45.88 | 77.42 |
| Example 2 | — | 97.63 | 52.38 |
| Example 3 | — | 63.96 | 68.63 |
| Example 4 | — | 62.76 | 69.20 |
| Reference Example | — | 40.42 | 80.17 |
| Comparative Example 2 | — | 25.01 | 88.14 |
| Comparative Example 3 | — | 47.58 | 76.58 |
| Comparative Example 4 | — | 40.65 | 80.05 |
| Comparative Example 5-1 | 20 | — | 90.81 |
| Comparative Example 5-2 | 30 | — | 85.83 |
| Comparative Example 5-3 | 40 | — | 79.67 |
| Comparative Example 5-4 | 50 | — | 75.17 |
| Comparative Example 5-5 | 60 | — | 71.17 |
| Comparative Example 5-6 | 70 | — | 65.21 |
| Comparative Example 5-7 | 80 | — | 61.22 |
| Comparative Example 5-8 | 90 | — | 56.77 |

After the hardness measurement was repeatedly performed according to the amount of the external plasticizer added, the following regression equation was derived using values obtained from the repeated tests, and the external plasticizer equivalent amounts (%) in Table 3 were inversely calculated.

$$Y=-0.0003X^3+0.0459X^2-2.7251X+134.4(R^2=0.9999) \text{ [Regression Equation]}$$

In the regression equation, X represents an amount of the external plasticizer added, Y represents hardness, and $R^2$ represents accuracy, wherein it indicates that there is no abnormality in the accuracy when the accuracy is 0.95 or more.

As illustrated in Table 3, the vinyl chloride-based copolymers of Examples 1 to 4 prepared by the preparation method according to the embodiment of the present invention had hardness values, which were reduced in comparison to Comparative Examples 2 to 5-8, and also had hardness values significantly lower than that of the vinyl chloride-based copolymer of Reference Example.

Specifically, as a result of the comparative analysis of the vinyl chloride-based copolymers of Examples 1 to 4 and the plasticized products of Comparative Examples 5-1 to 5-8 in which the external plasticizer was used, the vinyl chloride-based copolymers of Examples 1 to 4 had hardness values equal to or lower than those of the plasticized products of Comparative Examples 5-1 to 5-8 despite the fact that the external plasticizer was not used in the vinyl chloride-based copolymers of Examples 1 to 4. This may be considered due to the fact that the unsaturated fatty acid ester mixture-derived repeating unit in the vinyl chloride-based copolymers of Examples 1 to 4 acted as an internal plasticizer.

Also, with respect to the vinyl chloride-based copolymers of Comparative Examples 2 to 4, since the vinyl chloride-based copolymers had the unsaturated fatty acid ester mixture-derived repeating unit therein, the vinyl chloride-based copolymers exhibited low hardness values. However, as illustrated in the above-described analysis result of Table 2, since the conversion rates were significantly lower than those of the vinyl chloride-based copolymers of Example 1 (compared with Comparative Example 2), Example 3 (compared with Comparative Example 3), and Example 4 (compared with Comparative Example 4), the vinyl chloride-based copolymers of Comparative Examples 2 to 4 had hardness values significantly higher than those of the vinyl chloride-based copolymers of Example 1, Example 3, and Example 4 in which the unsaturated fatty acid ester mixture was used at the same ratio.

Experimental Example 3

In order to comparatively analyze processabilities of the vinyl chloride-based copolymers of Examples 1 to 4, Comparative Examples 2 to 4, and Reference Example and the plasticized product of Comparative Example 5-3, melt viscosity was measured. The results thereof are presented in Table 4 below. In this case, a thermoplastic resin composition was prepared by mixing 3 parts by weight of a tin-based stabilizer and 1 part by weight of a stearyl-based lubricant with 100 parts by weight of each vinyl chloride-based copolymer, and the melt viscosity was then obtained by measuring viscoelastic behavior with a Rheo-tester 2000 (Göttfert GmbH) while changing a shear rate as illustrated in the following Table 4.

As illustrated in Table 4, the thermoplastic resin compositions respectively including the vinyl chloride-based copolymers of Examples 1 to 4 prepared according to the preparation method according to the embodiment of the present invention exhibited melt viscosities significantly lower than those of the thermoplastic resin compositions respectively including the vinyl chloride-based copolymers of Comparative Example 2, Comparative Example 3, Comparative Example 4, and Comparative Example 5-3 under the entire experimental conditions, and, as a result, it was confirmed that the thermoplastic resin compositions respectively including the vinyl chloride-based copolymers of Examples 1 to 4 may have superior processability. Therefore, a thermoplastic resin molded article prepared from the thermoplastic resin composition including the vinyl chloride-based copolymer may have excellent processability.

The invention claimed is:

1. A method of preparing a vinyl chloride-based copolymer, the method comprising adding an unsaturated fatty acid ester mixture to a vinyl chloride-based monomer and performing polymerization,
   wherein the vinyl chloride-based monomer is a vinyl chloride monomer alone or a combination of a vinyl chloride monomer and a vinyl-based monomer copolymerizable therewith,
   wherein the adding the unsaturated fatty acid ester mixture is performed after initiation of the polymerization by continuous addition or by divided addition of two or more portions, and terminated at a polymerization conversion rate of 35% or less,
   wherein the continuous addition is performed in which the addition is started when the polymerization conversion rate is 1% or more, the addition is terminated when the polymerization conversion rate is 35% or less, and an entire amount of the mixture used is added at a constant rate from the start to the termination of the addition, and
   wherein the divided addition is performed in which a first fraction of an entire amount of the mixture is primarily added when the polymerization conversion rate is in a range of 1% to 15%, and a remaining second fraction, excluding the first fraction, of the entire amount of the mixture is secondarily added when the polymerization conversion rate is in a range of 25% to 35%.

2. The method of claim 1, wherein the unsaturated fatty acid ester mixture is a mixture of a cis isomer of an unsaturated fatty acid ester and a trans isomer of the unsaturated fatty acid ester, and

TABLE 4

| | | Melt viscosity ($\eta$, Pa · s) | | | | | | | | |
|---|---|---|---|---|---|---|---|---|---|---|
| | | Example | | | | Comparative Example | | | | Reference |
| Category | | 1 | 2 | 3 | 4 | 2 | 3 | 4 | 5-3 | Example |
| Shear rate ($v$, s$^{-1}$) | 100 | 476.07 | 83.31 | 145.55 | 159.26 | 618.25 | 501.77 | 545.83 | 929.55 | 562.36 |
| | 200 | 357.46 | 60.65 | 86.92 | 139.44 | 512.51 | 412.23 | 457.42 | 668.52 | 492.55 |
| | 300 | 242.28 | 44.71 | 61.27 | 103.54 | 437.67 | 360.99 | 381.25 | 559.26 | 403.36 |
| | 400 | 193.84 | 29.53 | 57.6 | 89.82 | 342.25 | 262.25 | 304.88 | 434.35 | 296.07 |
| | 500 | 126.02 | 27.61 | 51.73 | 82.34 | 309.07 | 220.62 | 247.51 | 370.76 | 227.46 |
| | 600 | 101.82 | 25.23 | 47.27 | 77.21 | 266.78 | 180.64 | 212.32 | 328.1 | 192.28 |
| | 700 | 81.61 | 22.93 | 42.65 | 72.71 | 226.45 | 155.66 | 173.67 | 296.79 | 163.84 |
| | 800 | 55.65 | 21.83 | 39.61 | 66.64 | 221.54 | 135.8 | 156.21 | 270.82 | 146.02 |
| | 1,000 | 51.29 | 20.79 | 25.79 | 45.83 | 162.83 | 124.96 | 134.65 | 231.79 | 131.82 | the cis isomer of the unsaturated fatty acid ester and the trans isomer of the unsaturated fatty acid ester in the mixture have a weight ratio of 60:40 to 99:1.

3. The method of claim 2, wherein the cis isomer of the unsaturated fatty acid ester and the trans isomer of the unsaturated fatty acid ester in the mixture have a weight ratio of 65:35 to 90:10.

4. The method of claim 2, wherein the cis isomer of the unsaturated fatty acid ester is a compound represented by Formula 1, and the trans isomer of the unsaturated fatty acid ester is a compound represented by Formula 2:

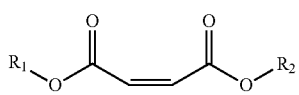

[Formula 1]

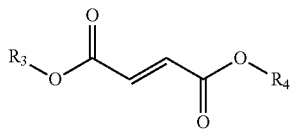

[Formula 2]

in Formula 1 or 2,

R₁ to R₄ are each independently selected from the group consisting of an alkyl group having 2 to 16 carbon atoms, a cycloalkyl group having 3 to 16 carbon atoms, and a combination thereof.

5. The method of claim 1, wherein the first fraction and the second fraction have a weight ratio of 9:1 to 1:9.

6. The method of claim 1, wherein the polymerization is performed by suspension polymerization in a solvent in the presence of a polymerization initiator and a protective colloid auxiliary.

7. The method of claim 6, wherein the protective colloid auxiliary is one selected from the group consisting of a vinyl alcohol-based resin, cellulose, and an unsaturated organic acid polymer, or a mixture of two thereof.

8. The method of claim 6, wherein the protective colloid auxiliary is a mixture in which a vinyl alcohol-based resin and cellulose are mixed in a weight ratio of 5:1 to 7:7, and the vinyl alcohol-based resin is a mixture in which a first polyvinyl alcohol having a degree of hydration of greater than 50 wt % and equal to or less than 90 wt % and a second polyvinyl alcohol having a degree of hydration of 30 wt % to 50 wt % are mixed in a weight ratio of 2:1 to 1:2.

9. The method of claim 1, wherein the unsaturated fatty acid ester mixture is used in an amount of 3 parts by weight to 53 parts by weight based on 100 parts by weight of the vinyl chloride-based monomer.

10. The method of claim 9, wherein the unsaturated fatty acid ester mixture is used in an amount of 20 parts by weight to 50 parts by weight based on 100 parts by weight of the vinyl chloride-based monomer.

11. A vinyl chloride-based copolymer prepared by the method of claim 1.

12. The vinyl chloride-based copolymer of claim 11, wherein the vinyl chloride-based copolymer comprises 65 wt % to 97 wt % of a vinyl chloride-based monomer-derived repeating unit based on 100 wt % of the vinyl chloride-based copolymer; and 3 wt % to 35 wt % of an unsaturated fatty acid ester-derived repeating unit based on 100 wt % of the vinyl chloride-based copolymer.

13. The vinyl chloride-based copolymer of claim 12, wherein the unsaturated fatty acid ester-derived repeating unit comprises a repeating unit derived from a cis isomer of the unsaturated fatty acid ester and a repeating unit derived from a trans isomer of the unsaturated fatty acid ester in a weight ratio of 60:40 to 99:1.

14. The vinyl chloride-based copolymer of claim 13, wherein the cis isomer of the unsaturated fatty acid ester is a compound represented by Formula 1, and the trans isomer of the unsaturated fatty acid ester is a compound represented by Formula 2:

[Formula 1]

[Formula 2]

in Formula 1 or 2,

R₁ to R₄ are each independently selected from the group consisting of an alkyl group having 2 to 16 carbon atoms, a cycloalkyl group having 3 to 16 carbon atoms, and a combination thereof.

15. The vinyl chloride-based copolymer of claim 11, wherein the vinyl chloride-based copolymer has a polydispersity of 1.5 to 2.5.

16. The vinyl chloride-based copolymer of claim 11, wherein the vinyl chloride-based copolymer has a weight-average molecular weight of 70,000 g/mol to 300,000 g/mol and a number-average molecular weight of 50,000 g/mol to 150,000 g/mol.

17. The vinyl chloride-based copolymer of claim 11, wherein the vinyl chloride-based copolymer has an average pore diameter of 100 nm or less and a porosity of 40 vol % or less.

18. The vinyl chloride-based copolymer of claim 11, wherein the vinyl chloride-based copolymer has a cold plasticizer absorption of 10 wt % or less.

19. The vinyl chloride-based copolymer of claim 11, wherein the vinyl chloride-based copolymer has a hardness of 50 HS to 110 HS.

* * * * *